United States Patent
Oral et al.

(10) Patent No.: US 10,437,384 B2
(45) Date of Patent: Oct. 8, 2019

(54) WATER DETECTION AND WIPE DETECTION ALGORITHMS FOR TOUCHSCREEN PROXIMITY SENSING

(71) Applicant: Parade Technologies, Ltd., Santa Clara, CA (US)

(72) Inventors: Yesim Oral, Istanbul (TR); Tayyar Guzel, Istanbul (TR)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 506 days.

(21) Appl. No.: 15/067,720

(22) Filed: Mar. 11, 2016

(65) Prior Publication Data

US 2016/0266717 A1 Sep. 15, 2016

Related U.S. Application Data

(60) Provisional application No. 62/132,717, filed on Mar. 13, 2015.

(51) Int. Cl.
*G06F 3/041* (2006.01)
*G06F 3/044* (2006.01)
*G06F 3/0488* (2013.01)

(52) U.S. Cl.
CPC ............ *G06F 3/0418* (2013.01); *G06F 3/044* (2013.01); *G06F 3/0488* (2013.01)

(58) Field of Classification Search
CPC ...... G06F 3/044; G06F 3/0416; G06F 3/0418; G06F 3/0412; H03K 2217/94026
See application file for complete search history.

(56) References Cited

U.S. PATENT DOCUMENTS

| | | | | |
|---|---|---|---|---|
| 8,031,274 B2 * | 10/2011 | Sakurai | ................ | G06F 3/0436 178/18.04 |
| 8,339,286 B2 * | 12/2012 | Cordeiro | ................ | G06F 3/0418 341/20 |
| 8,531,425 B2 * | 9/2013 | Westerman | ........... | G06F 3/0488 345/156 |
| 8,717,331 B2 * | 5/2014 | Kremin | ................ | G06F 3/0418 345/174 |
| 8,773,146 B1 * | 7/2014 | Hills | ...................... | G01N 27/22 324/658 |

(Continued)

*Primary Examiner* — Michael J Jansen, II
(74) *Attorney, Agent, or Firm* — Morgan, Lewis & Bockius LLP

(57) ABSTRACT

The various implementations described herein include systems, methods and/or devices used to enable touchscreen proximity sensing. An exemplary method is performed at a touch sensitive device and includes detecting the presence of water on a capacitive sense array (CSA). The method detects decreased electrode responses from at least a subset of a plurality of sensor electrodes of the CSA that satisfy one or more first trigger conditions. The method further includes: (1) normalizing the CSA based on the detected decrease in electrode responses to form a second baseline, (2) determining that the water is removed from the portion of the CSA based on one or more subsequent electrode responses from at least the subset of the plurality of sensor electrodes that satisfy one or more second trigger conditions, and (3) normalizing the CSA based on the detected one or more subsequent electrode responses to form a third baseline.

17 Claims, 6 Drawing Sheets

(56) References Cited

U.S. PATENT DOCUMENTS

| | | | | |
|---|---|---|---|---|
| 8,823,678 B2* | 9/2014 | Li | G06F 3/044 | 178/18.06 |
| 8,902,172 B2* | 12/2014 | Peng | G06F 3/0416 | 345/173 |
| 8,976,153 B2* | 3/2015 | Toda | G06F 3/044 | 345/174 |
| 8,982,097 B1 | 3/2015 | Kuzo | G06F 3/0418 | 345/174 |
| 9,024,912 B2* | 5/2015 | Atkinson | G06F 3/044 | 345/156 |
| 9,092,098 B2* | 7/2015 | Konovalov | G06F 3/044 | |
| 9,105,255 B2* | 8/2015 | Brown | G06F 3/0416 | |
| 9,134,850 B2* | 9/2015 | Ye | G06F 3/044 | |
| 9,134,868 B2* | 9/2015 | Chang | G06F 3/044 | |
| 9,164,137 B2* | 10/2015 | Page | G01R 27/2605 | |
| 9,377,905 B1* | 6/2016 | Grivna | G06F 3/044 | |
| 9,542,904 B2* | 1/2017 | Yamaguchi | G06F 3/044 | |
| 9,632,646 B2* | 4/2017 | Yamaguchi | G06F 3/047 | |
| 9,665,217 B2* | 5/2017 | Rabii | G06F 3/044 | |
| 9,684,418 B1* | 6/2017 | Hills | G06F 3/041 | |
| 9,851,853 B2* | 12/2017 | O'Connor | G06F 3/044 | |
| 9,939,969 B2* | 4/2018 | Yuan | G06F 3/044 | |
| 10,007,383 B2* | 6/2018 | Chang | G06F 3/044 | |
| 10,025,429 B2* | 7/2018 | Westerman | G06K 9/00375 | |
| 10,283,075 B2* | 5/2019 | Yamaguchi | G06F 3/044 | |
| 2007/0171212 A1* | 7/2007 | Sakurai | G06F 3/0412 | 345/177 |
| 2008/0136792 A1* | 6/2008 | Peng | G06F 3/0416 | 345/174 |
| 2011/0241907 A1* | 10/2011 | Cordeiro | G06F 3/0418 | 341/20 |
| 2012/0050214 A1* | 3/2012 | Kremin | G06F 3/0418 | 345/174 |
| 2012/0146924 A1* | 6/2012 | Inoue | G06F 3/0418 | 345/173 |
| 2012/0176179 A1* | 7/2012 | Harders | H03K 17/962 | 327/517 |
| 2012/0268415 A1* | 10/2012 | Konovalov | G06F 3/0418 | 345/174 |
| 2012/0287074 A1* | 11/2012 | Westerman | G06F 3/0488 | 345/173 |
| 2012/0293447 A1* | 11/2012 | Heng | G06F 3/044 | 345/174 |
| 2013/0176268 A1* | 7/2013 | Li | G06F 3/044 | 345/174 |
| 2013/0207935 A1* | 8/2013 | Toda | G06F 3/0418 | 345/174 |
| 2013/0234987 A1* | 9/2013 | Ye | G06F 3/0418 | 345/174 |
| 2014/0062949 A1* | 3/2014 | Chang | G06F 3/044 | 345/174 |
| 2014/0062950 A1* | 3/2014 | Chang | G06F 3/044 | 345/174 |
| 2014/0092033 A1* | 4/2014 | Chang | G06F 3/0418 | 345/173 |
| 2014/0125623 A1* | 5/2014 | Atkinson | G06F 3/044 | 345/174 |
| 2015/0162932 A1* | 6/2015 | Page | G01R 27/2605 | 324/658 |
| 2015/0179122 A1* | 6/2015 | Brown | G06F 3/0416 | 345/174 |
| 2015/0227241 A1* | 8/2015 | Atkinson | G06F 3/044 | 345/174 |
| 2015/0309610 A1* | 10/2015 | Rabii | G06F 3/044 | 345/174 |
| 2015/0324035 A1* | 11/2015 | Yuan | G06F 3/0416 | 345/174 |
| 2015/0346903 A1* | 12/2015 | O'Connor | G09G 5/003 | 345/173 |
| 2015/0370385 A1* | 12/2015 | Yamaguchi | G06F 3/044 | 345/174 |
| 2015/0370386 A1* | 12/2015 | Yamaguchi | G06F 3/044 | 345/174 |
| 2015/0370387 A1* | 12/2015 | Yamaguchi | G06F 3/047 | 345/174 |
| 2016/0259448 A1* | 9/2016 | Guarneri | G06F 3/0418 | |
| 2016/0266717 A1* | 9/2016 | Oral | G06F 3/0418 | |
| 2016/0349910 A1* | 12/2016 | Westerman | G06K 9/00375 | |

* cited by examiner

WATER DETECTION AND WIPE DETECTION ALGORITHMS FOR TOUCHSCREEN PROXIMITY SENSING

RELATED APPLICATIONS

This application claims priority to U.S. Provisional Application Ser. No. 62/132,717, filed Mar. 13, 2015, entitled "Water Detection and Wipe Detection Algorithm for Touchscreen Proximity Sensing," which is incorporated by reference herein in its entirety.

TECHNICAL FIELD

The disclosed implementations relate generally to touch-sensitive displays, and in particular, to proximity sensing on a touch-sensitive display.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of capacitance sensing. A capacitance sensing system may include a touch screen, touch-sensor pad, a touch-sensor slider, or touch-sensor buttons, and may include an array of one or more capacitive sensor elements (also referred to as sensor electrodes). Capacitive sensing typically involves measuring, through sensor signals (e.g., increases or decreases in electrode responses), a change in capacitance associated with the capacitive sensor elements to determine a presence of a conductive object (e.g., a user's finger or head) relative to the capacitive sensor elements. However, a user's finger or head is difficult to detect and process when water (e.g., water droplets) contacts and settles on the touch screen. Therefore, a need exists for effective capacitance sensing when water is on the touch screen.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable touchscreen proximity sensing.

(A1) Some implementations include a method for determining that a liquid is on at least a portion of the capacitive sense array (e.g., at an electronic device having a processor and a capacitive sense array that includes a plurality of sensor electrodes). Determining that the liquid is on at least the portion of the capacitive sense array includes detecting satisfaction of one or more trigger conditions (also referred to herein as electrode response criteria or first electrode response criteria). The one or more trigger conditions include detecting a decrease in electrode responses from at least a subset of the plurality of sensor electrodes that differs from a first baseline by at least a first threshold amount. In some implementations, the one or more triggers conditions include detecting the decrease in electrode responses that differ from the first baseline for at least a first predefined time period. In some implementations, the one or more triggers conditions include determining that the decrease in electrode responses reach or surpass the first threshold amount prior to expiration of a time limit. For example, the decrease in sensor electrode responses is not associated with liquid contacting the capacitive sense array if the decrease takes longer than the time limit. In some implementations, the time limit is set based on an average electrode response time when water contacts a respective sensor electrode.

After determining that the liquid is on at least the portion of the capacitive sense array, the method further includes normalizing the capacitive sense array based on the detected decrease in electrode responses to form a second baseline. In some implementations, the second baseline differs from the first baseline by at least the first threshold amount.

The method further includes determining that the liquid is removed from the portion of the capacitive sense array. Determining that the liquid is removed from the portion of the capacitive sense array includes detecting satisfaction of one or more trigger conditions (also referred to herein as electrode response criteria or second electrode response criteria). The one or more trigger conditions include detecting one or more subsequent electrode responses from at least the subset of the plurality of sensor electrodes that differ from the second baseline by at least a second threshold amount. In some implementations, the one or more triggers conditions include detecting the subsequent electrode responses that differ from the second baseline for a second predefined time period. In some implementations, the one or more triggers conditions include determining that an increase in electrode responses reach or surpass the second threshold amount prior to expiration of a time limit. In some implementations, the method further includes normalizing the capacitive sense array based on the detected one or more subsequent electrode responses to form a third baseline. In some implementations, the third baseline differs from the second baseline by at least the second threshold amount.

(A2) In some implementations of the method of A1, the method further includes, prior to normalization the capacitive sense array based on the detected subsequent electrode responses, identifying a peak electrode response associated with the removal of the liquid, and identifying a subsequent decrease in electrode responses relative to the identified peak electrode response.

(A3) In some implementations of the method of any of A1-A2, determining that the liquid is on at least the portion of the capacitive sense array includes measuring self-capacitance of sensor electrodes that compose the portion of the capacitive sense array.

(A4) In some implementations of the method of any of A1-A3, the method further includes, while determining that the liquid is on at least a portion of the capacitive sense array, comparing the detected decrease in electrode responses from at least the subset of the plurality of sensor electrodes against decreases in electrode responses recorded during one or more previous cycles. In accordance with a determination that the detected decrease in electrode responses substantially match the decreases in electrode responses recorded during the one or more previous cycles, signaling that the liquid is on at least the portion of the capacitive sense array. In some implementations, prior to signaling that the liquid is on at least the portion of the capacitive sense array, the method further includes comparing the detected decrease in electrode responses against an average sensor electrode response recorded at an initialization of the touch sensitive device (e.g., upon power up of the electronic device). In accordance with a determination that the detected decrease in electrode responses substantially match the average sensor electrode response recorded at the initialization of the touch sensitive device, signaling that the liquid is on at least the portion of the capacitive sense array.

(A5) In some implementations of the method of any of A1-A4, determining that the liquid is removed from the portion of the capacitive sense includes detecting one or more increases in electrode responses followed by one or more decreases in electrode responses. In some implementations, determining that the liquid is removed from the portion of the capacitive sense includes detecting a decrease associated with one or more subsequent sensor electrode response that occur at some point in time after the detected decrease associated with the liquid.

(A6) In some implementations of the method of any of A1-A5, the method further includes, subsequent to normalizing the capacitive sense array based on the detected decrease in electrode responses to form the second baseline, detecting one or more proximity sensing events. In response to detecting one or more proximity sensing events, removing power from a display portion of the electronic device.

(A7) In some implementations of the method A6, the electrode responses associated with each of the one or more proximity sensing events differ from the second baseline by less than the second threshold amount.

(A8) In another aspect, a system is provided. The system includes a capacitive sense array that includes a plurality of sensor electrodes, and a processing device coupled to the capacitive sense array. The processing device is configured to perform the method of any one of A1-A7 described above.

(A9) In yet another aspect, a non-transitory computer-readable storage medium is provided. The non-transitory computer-readable storage medium stores one or more programs configured for execution by one or more processors of a sensing system. The one or more programs include instructions for performing the method of any one of A1-A7 described above.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

The various implementations described herein include systems, methods and/or devices used to enable water detection and wipe detection algorithms for touchscreen proximity sensing. Some implementations include systems, methods and/or devices to detect a liquid on the capacitance sensing system and subsequent removal of the liquid from the capacitance sensing system while also facilitating normal functionality of the capacitance sensing system (e.g., detection of unrelated conductive events such as a user putting the capacitance sensing system up to his or her face).

Figure 1:
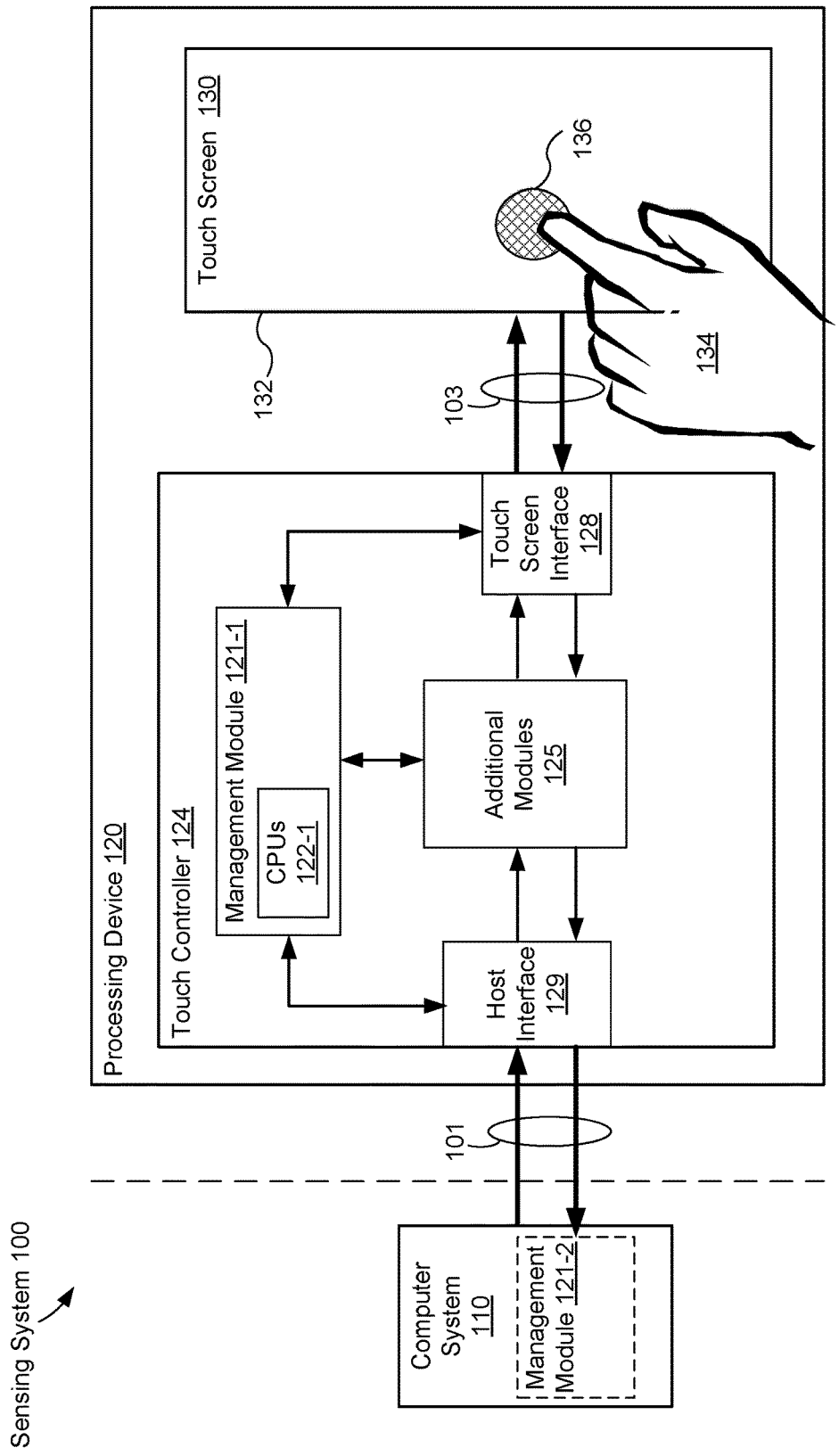
FIG. 1 is a block diagram illustrating a sensing system, in accordance with various implementations.

Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, sensing system 100 includes a processing device 120 (also sometimes called a touch sensitive device), which includes a touch controller 124 and a touch screen 130 (also sometimes called a touch sensitive display), and is used in conjunction with or includes a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input. In some implementations, the touch screen provides the functionality of a proximity sensor.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., a capacitive sense array) that forms a touch sensitive display. In some implementations, the sensing array 132 includes one or more of light-sensitive elements, light emitting elements, photosensitive elements, pressure sensitive elements, and/or capacitive sensor elements (also referred to as sensor electrodes). The capacitive sensor elements are electrodes of conductive material, such as copper. The sensing array 132 is sensitive to an input object 134 at a location 136 (e.g., a user's finger or rain droplets). In some implementations, the input object 134 is a user's head.

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., random access memory and/or flash memory). In some implementations, the memory module stores detected electrode responses, electrode response criteria, previously determined baselines, and the like. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2:
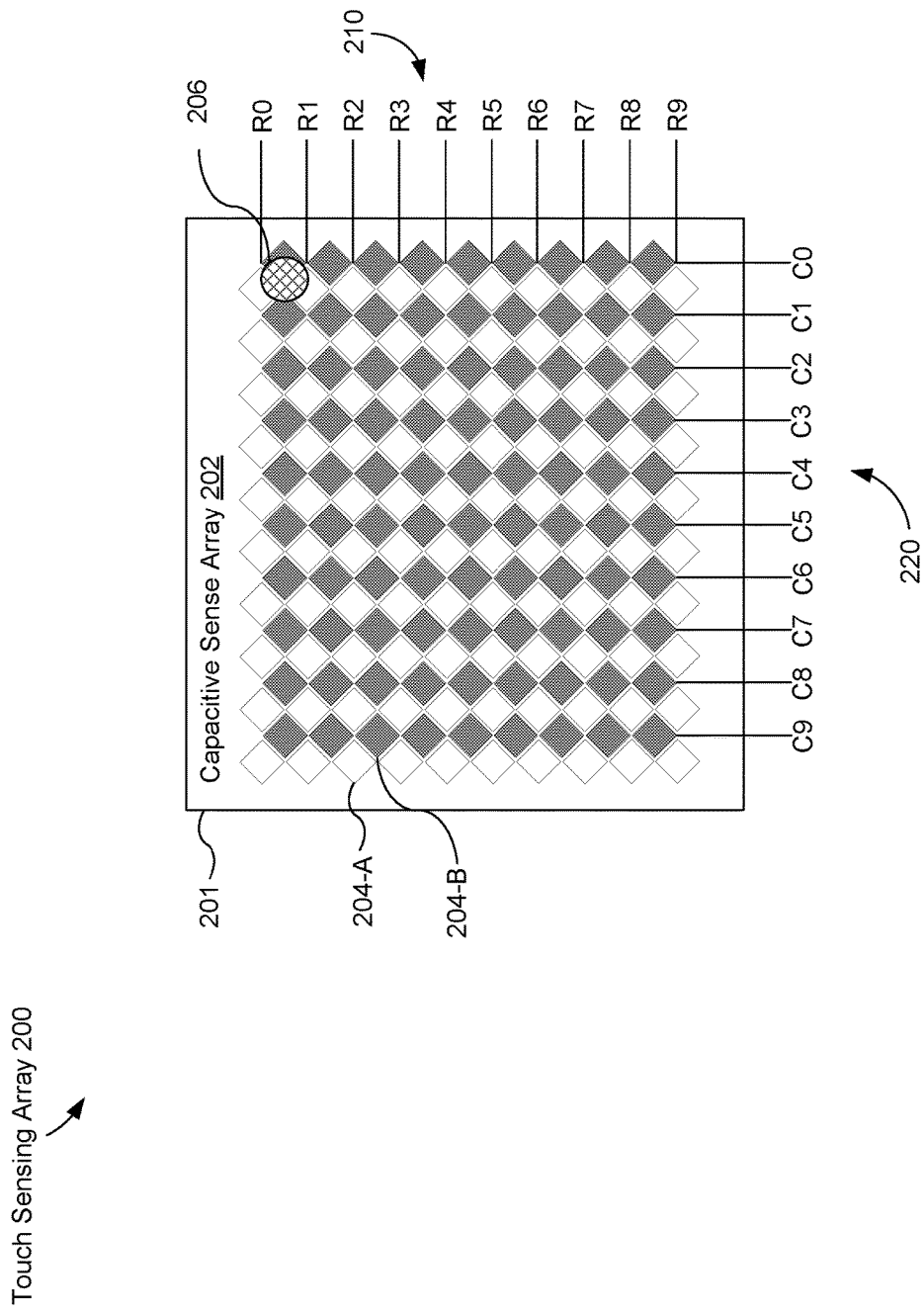
FIG. 2 is a diagram illustrating a touch sensing array including a substrate having a capacitive sense array (e.g., a touch screen), in accordance with various implementations.

FIG. 2 is a diagram illustrating a touch sensing array 200 (e.g., touch screen 130, FIG. 1) including a substrate 201 (e.g., a dielectric material) having a capacitive sense array 202 (e.g., sensing array 132, FIG. 1), in accordance with various implementations. As shown, FIG. 2 includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., management module 121-1, FIG. 1). In the operations described in more detail below, each of the rows R0-R9 210 and columns C0-C9 220 of sensor elements may operate as both transmit and receive electrodes.

In some implementations, the plurality of sensor electrodes 204 includes both self-capacitance sensors and mutual-capacitance sensors. Within the capacitive sense array 202, each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9 210 are associated with a Y-coordinate or range of Y-coordinates of the X-Y plane. In this way, the sensing module (e.g., management module 121-1, FIG. 1) can determine a location (e.g., touch location 136, FIG. 1) of a touch 206 on the capacitive sense array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

In some implementations, a processing device (e.g., processing device 120, FIG. 1) or one or more components of the processing device (e.g., management module 121-1, FIG. 1) measures capacitance of the plurality of sensor electrodes 204 using self-capacitance sensing. In some implementations, self-capacitance sensing measures added (or subtracted) capacitance at each of the plurality of sensor electrodes 204. For example, a user's touch (e.g., a finger) at a specific sensor electrode (e.g., sensor electrode 204-A) increases capacitance at the specific sensor electrode because the finger's capacitance is added to the capacitance of the specific sensor electrode. The processing device detects a "touch" when the added capacitance to the specific sensor electrode, relative to a baseline, exceeds a predefined threshold. Alternatively, water (e.g., rain droplets) at a specific sensor electrode (e.g., sensor electrode 204-A) decrease capacitance at the specific sensor electrode because water causes a decrease in capacitance of the specific sensor electrode. The processing device, however, will trigger a response when the subtracted capacitance to the specific sensor electrode, relative to a baseline, exceeds a predefined threshold.

In some implementations, the processing device measures capacitance of the plurality of sensor electrodes 204 using mutual-capacitance sensing. In some implementations, mutual-capacitance sensing measures capacitance between a column electrode (e.g., a transmitter (TX) electrode), and a row electrode (e.g., a receiver (RX) electrode). For example, mutual-capacitance sensing measures a change (e.g., a decrease or increase) in capacitance between the column electrode (e.g., sensor electrode 204-A) and the row electrode (e.g., sensor electrode 204-B) resulting from a user's touch (e.g., a finger).

Figure 3:
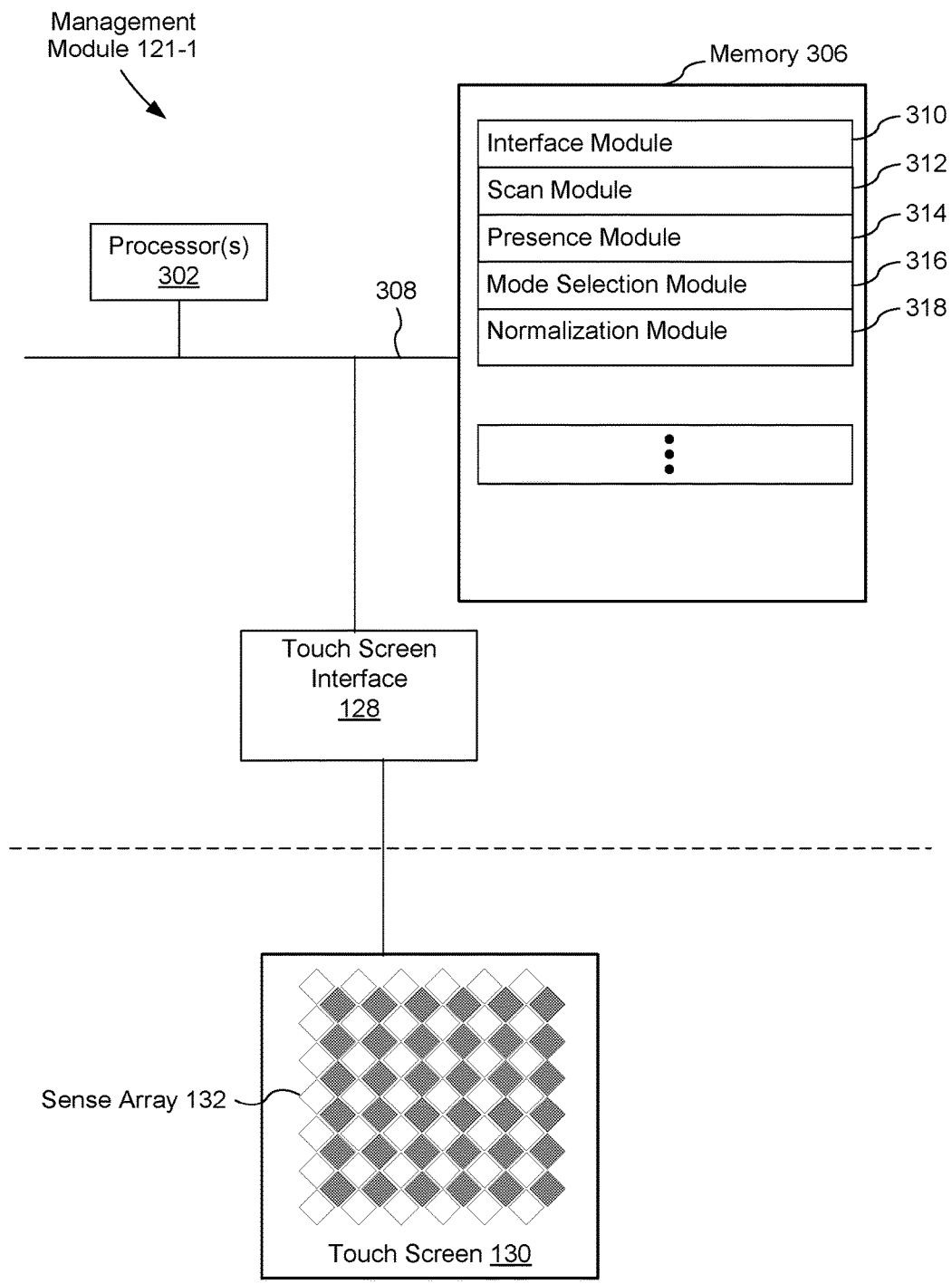
FIG. 3 is a block diagram illustrating an implementation of a management module (e.g., the management module 121-1 shown in FIG. 1).

FIG. 3 is a block diagram illustrating an implementation of a management module (e.g., management module 121-1, FIG. 1). The management module 121-1 typically includes one or more processing units 302 (sometimes herein called CPUs, processors, or hardware processors, and sometimes implemented using microprocessors, microcontrollers, or the like) for executing modules, programs and/or instructions stored in memory 306 and thereby performing processing operations, memory 306 and one or more communication buses 308 for interconnecting these components. The communication buses 308 optionally include circuitry (sometimes called a chipset) that interconnects and controls communications between system components. In some implementations, the management module 121-1 is coupled to a touch screen (e.g., touch screen 130, FIG. 1, and in turn, sense array 132) by the communication buses 308 and the touch screen interface 128. In some implementations, the memory 306, or the computer readable storage medium of the memory 306 stores the following modules and data used by the modules:
- an interface module 310 that is used for communicating with other components of the electronic device.
- a scan module 312 that is used to convert sensor signals (e.g., convert analog signals, such as voltage and/or change, into digital signals, or vice versa);
- a presence module 314 that is used to detect presence of a conductive object (e.g., a user's finger and/or a liquid), or lack of a conductive object;
- a mode selection module 316 that is used to select a mode of operation of the electronic device based on electrode responses from the capacitive sense array; and
- a normalization module 318 that is used to normalize electrode responses from the capacitive sense array (i.e., establish a new baseline).

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

In some implementations, the mode selection module 316 includes the water detection algorithm and the wipe detection algorithm.

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores detected electrode responses, electrode response criterions, previously determined baselines, the water detection algorithm, the wipe detection algorithm, and other relevant information. In some implementations, the programs, modules, and data structures stored in memory 306, or the computer readable storage medium of the memory 306, provide instructions for implementing respective operations in the methods described below with reference to FIG. 6.

Figure 4:
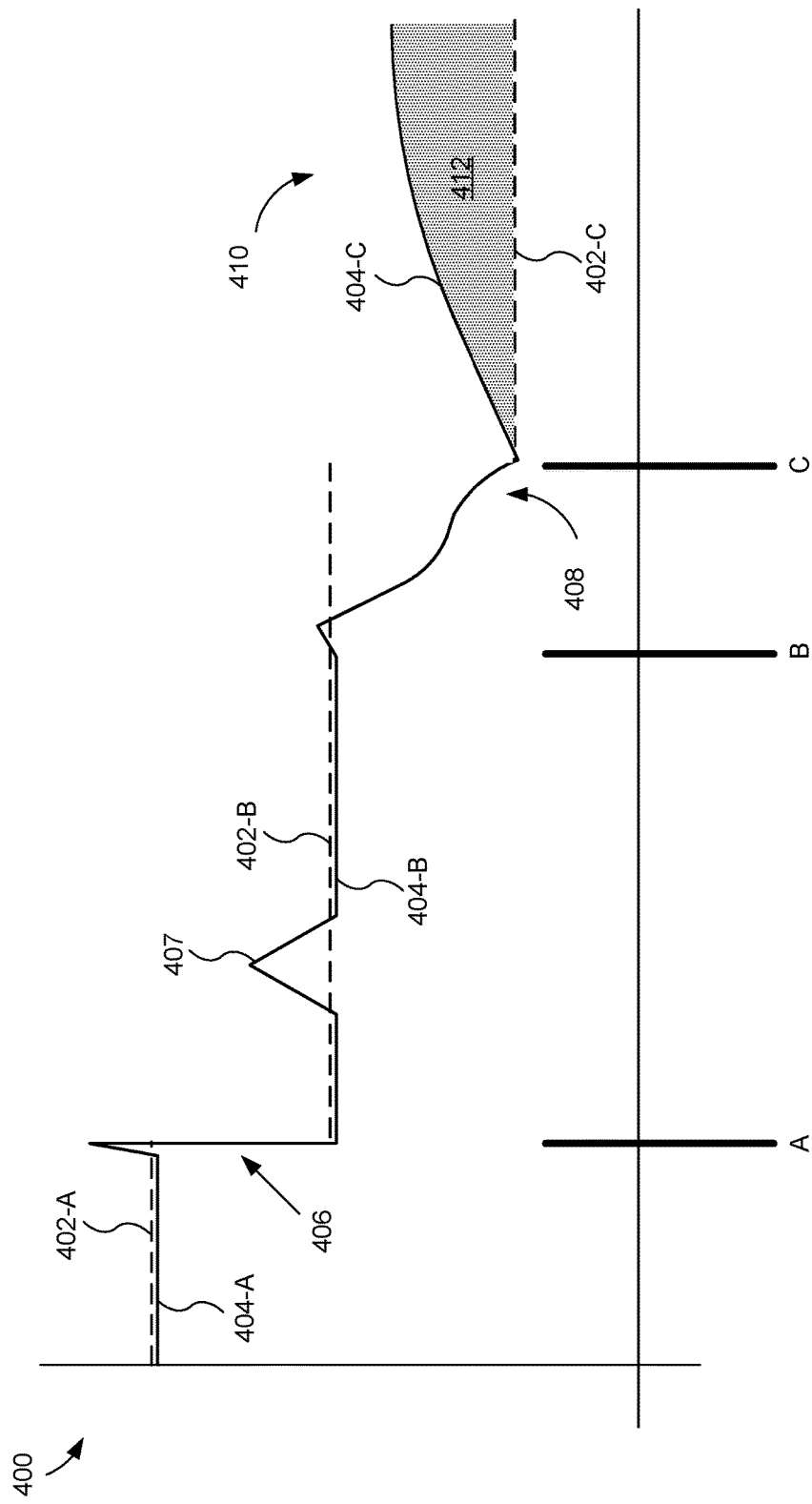
FIG. 4 is a conceptual diagram of sensor electrode responses and a plurality of baselines during touchscreen proximity sensing performed on a touch sensitive display using a water detection algorithm, in accordance with some implementations.

FIG. 4 is a conceptual diagram of sensor electrode responses and baselines of a touch sensitive display (also referred to as a touch screen) in water detection mode 400, in accordance with some implementations. In particular, FIG. 4 illustrates sensor electrode responses and baselines when water contacts and is subsequently removed from the touch sensitive display while using a water detection algorithm. The touch sensitive display (e.g., touch screen 130, FIG. 1) includes a capacitive sense array (e.g., capacitive sense array 202, FIG. 2). The capacitive sense array includes a plurality of sensor electrodes (e.g., sensor electrodes 204-A and 204-B, FIG. 2). The x-axis designates time while the y-axis designates detected capacitance. The touch sensitive display also detects proximity sensing events using touchscreen proximity sensing. Touchscreen proximity sensing scans self-capacitance sensors connected to the plurality of sensor electrodes. The self-capacitance sensors detect the presence of objects near (or touching) the touch sensitive display (e.g., a user's face approaching the touch sensitive display is a proximity sensing event). It should be noted that, in some implementations, touchscreen proximity sensing scans mutual-capacitance sensors.

A first baseline portion 402-A (dashed line) represents when no objects or other debris are interacting with the touch sensitive display. In some implementations, the first baseline portion 402-A is a factory calibrated baseline. In some implementations, the first baseline portion 402-A is calibrated upon power up of the device. In some implementations, the first baseline portion 402-A is recovered from memory (e.g., memory 306, FIG. 3) of the touch sensitive device. First sensor electrode responses 404-A (solid line) represents capacitance measurements when no objects or other debris are on the touch sensitive display. Accordingly, a difference between the first sensor electrode responses 404-A and the first baseline portion 402-A is close to zero.

At point A, water contacts the touch screen (e.g., rain drops contact the touch screen). The water causes a substantial decrease in electrode responses 406 when it contacts the touch screen (e.g., capacitance measurements fall below the first baseline portion 402-A by a threshold amount). Second sensor electrode responses 404-B (solid line between points A and B) represent capacitance measurements when the water contacts and settles on the touch sensitive display. The water detection algorithm compares the second sensor electrode responses 404-B with: (1) sensor electrode response data from a number of previous water detection cycles and (2) an average sensor electrode response recorded at the initialization of the touch sensitive device (e.g., upon power up of the touch sensitive device).

After the water contacts and settles on the touch screen, the first baseline portion 402-A is updated (e.g., reset or recalibrated) to form a second baseline portion 402-B (dashed line between points A and B). The second baseline portion 402-B is set to a value (e.g., a capacitance measurement) so that a difference between the second sensor electrode responses 404-B and the second baseline portion 402-B is close to zero (i.e., set to a value to substantial reduce or eliminate adverse effects of noise). It should be noted that updating the baselines is also referred to as normalizing.

In some implementations, the second baseline portion 402-B is updated in response to satisfaction of electrode response criteria. In some implementations, satisfying the electrode response criteria (also referred to herein as trigger conditions) includes detecting water on at least a predefined number of sensor electrodes (e.g., detecting self-capacitance measurements for the predefined number of sensor electrodes). In some implementations, detecting water on the predefined number of sensor electrodes includes each of the predefined number of sensor electrodes having an electrode response (e.g., a self-capacitance measurement) that differs from the first baseline portion 402-A by a threshold amount. In some implementations, satisfying the electrode response criteria includes detecting the predefined number of sensor electrodes with each having an electrode response that differs from the first baseline portion 402-A by the threshold amount for (or within) a predetermined period of time. For example, the first baseline portion 402-A updates to the second baseline portion 402-B if the first sensor electrode responses 404-A drop to the second sensor electrode responses 404-B prior to a time limit expiring. In this way, a frequency of false triggers is reduced, thereby saving processing time and effort.

It should be noted that a new baseline (e.g., a third baseline) is not formed when a user places his or her touch sensitive display near his or her head. As stated above, this event is referred to as a proximity sensing event. A proximity sensing event does not trigger updating (e.g., recalibration) of a new baseline because electrode responses associated with a proximity sensing event do not satisfy the one or more electrode response criteria. In some implementations, in response to detecting a proximity sensing event (e.g., proximity sensing event 407, FIG. 4), the processing device (e.g., processing device 120, FIG. 1) or one or more components of the processing device (e.g., management module 121-1, FIG. 1) turns off power to the touch sensitive display to save energy and also to prevent false touches caused by a user's face.

Between points A and B, one or more proximity sensing events are detected. As shown, a proximity sensing event 407 does not trigger recalibration of a new baseline as the proximity sensing event 407 does not satisfy the electrode response criteria. Consequently, the water detection algorithm allows the touch sensitive device to operate as if water were not present on the touch screen.

However, the touch sensitive device illustrated in FIG. 4 does not use a wipe detection algorithm. As a result, at point B, when a wipe is applied to the touch screen (e.g., user wipes the water off the touch screen from point B to point C) a momentary decrease in electrode responses 408 occurs when the user contacts the touch screen. Third sensor electrode responses 404-C (solid line to the right of point C) represent capacitance measurements when water is removed from the touch sensitive display. In some implementations, the momentary decrease in electrode responses 408 satisfies the electrode response criteria. Consequently, in response to the water being substantially removed from the touch screen, the second baseline portion 402-B is updated (e.g., reset or recalibrated) to form a third baseline portion 402-C (dashed line to the right of point C, as shown in FIG. 4). In some implementations, the momentary decrease in electrode responses 408 does not satisfy the one or more electrode response criteria and consequently the second baseline portion 402-B extends past point C.

As shown, the momentary decrease 408 is followed by an increase in electrode response 410. In some implementations, after the third baseline portion 402-C is formed, the increase in electrode responses 410 does not satisfy the one or more electrode response criteria. As a result, the third baseline portion 402-C is not updated to a potential fourth baseline (or in some implementations the third baseline is not formed depending on the magnitude and length of the momentary decrease in electrode responses 408). Shaped area 412 represents a difference between the third sensor electrode responses 404-C and the third baseline portion 402-C. Consequently, the processing device (e.g., processing device 120, FIG. 1) or one or more components of the processing device (e.g., management module 121-1, FIG. 1) processes the increase in electrode responses 410 associated with the wipe as a proximity sensing event. As discussed above, the processing device turns off power to the touch screen in response to detecting a proximity sensing event, treating this occurrence as if the user had put the touch screen up to his or her face when in fact the user had only wiped water off the touch screen.

Figure 5:
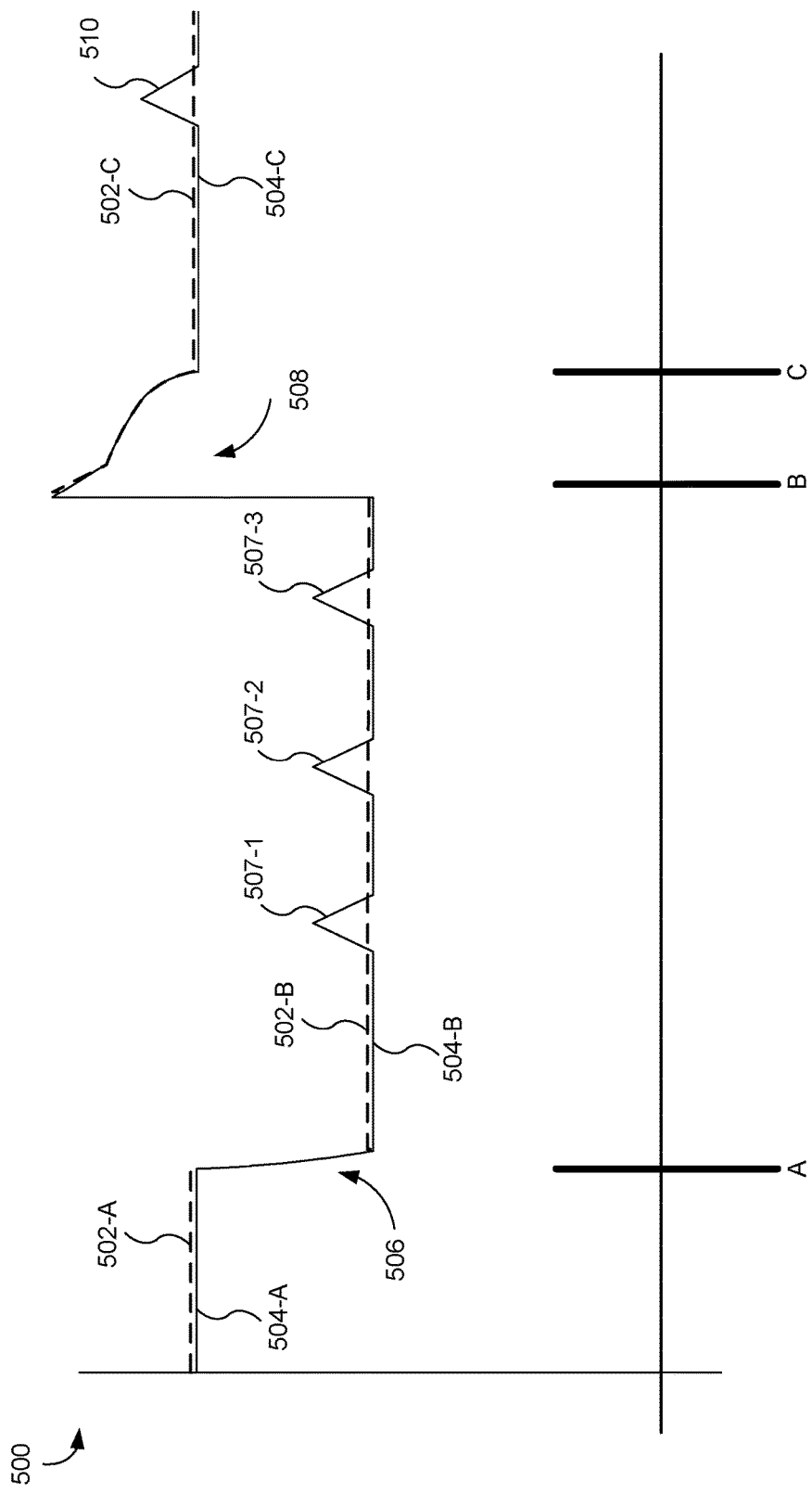
FIG. 5 is a conceptual diagram of sensor electrode responses and a plurality of baselines during touchscreen proximity sensing performed on a touch sensitive display using a water detection algorithm and a wipe detection algorithm, in accordance with some implementations.

FIG. 5 is a conceptual diagram of sensor electrode responses and baselines of a touch sensitive display in water detection mode and wipe detection mode 500, in accordance with some implementations. In particular, FIG. 5 illustrates a solution to the problem presented in FIG. 4 by using a wipe detection algorithm in combination with the water detection algorithm. As with FIG. 4, a first baseline portion 502-A (dashed line) represents when no objects or other debris are interacting with the touch sensitive display. First sensor electrode responses 504-A (solid line) represent capacitance measurements when no objects or other debris are on the touch sensitive display. Accordingly, a difference between the first sensor electrode responses 504-A and the first baseline portion 502-A is close to zero.

At point A, water contacts the touch screen (e.g., rain droplets contact the touch screen). The water causes a substantial decrease in electrode responses 506 when it contacts the touch screen. Second sensor electrode responses 504-B (solid line between points A and B) represent capacitance measurements when the water contacts and settles on the touch sensitive display. As discussed above, the water detection algorithm compares the second sensor electrode responses 504-B with: (1) sensor electrode response data from a number of previous water detection cycles and (2) an average sensor electrode response recorded at the initialization of the touch sensitive device (e.g., upon power up of the touch sensitive device).

In response to water contacting the touch screen, the first baseline portion 502-A is updated (e.g., reset or recalibrated) to form a second baseline portion 502-B (dashed line between points A and B). The second baseline portion 502-B is set to a value so that a difference between the second sensor electrode responses 504-B and the second baseline portion 502-B is close to zero.

Between points A and B, one or more proximity sensing events 507-1, 507-2, 507-3 are detected. As shown, the one or more proximity sensing events 507 do not trigger recalibration of a new baseline as none of the proximity sensing events satisfy the one or more electrode response criteria. Consequently, the water detection algorithm allows the touch sensitive device to operate as if water were not present on the touch screen.

At point B, a wipe is applied to the touch screen (e.g., user wipes the water off the touch screen during the time from point B to point C). The wipe causes a substantial increase in electrode responses when it contacts the touch screen followed by a substantial decrease in electrode responses (increase and subsequent decrease represented by reference numeral 508). At point B, the wipe detection algorithm is used to detect and process the wipe. In some implementations, the wipe is detected in accordance with a determination that the electrode responses after point B vary from negative to positive and subsequently positive to negative relative to one of the previously determined baselines (e.g., baseline 502-A or 502-B). For example, the wipe causes the substantial increase in electrode responses 508 resulting in capacitance measurements going from negative to positive. After the user's finger separates from the touch screen the substantial decrease in electrode responses 508 occurs. The variations from negative to positive and vice versa allow the processing device to detect the wipe as such variations in capacitance do not occur during normal operation, even when water is on the touch screen.

In some implementations, the wipe is detected when a second decrease in electrode responses is detected at some point in time after a first decrease in electrode responses is detected (e.g., decrease in electrode responses 506). The first and second decreases in the sensor electrode responses by themselves make it possible to detect the wipe via the wipe detection algorithm. In some implementations, the wipe is detected when the second decrease is detected within a predetermined time period after the first decrease is detected.

At point C, subsequent to detecting the wipe, third sensor electrode responses 504-C (solid line to the right of point C) represent capacitance measurements when the water is removed from the touch sensitive display. In response to the water being removed from the touch screen, the second baseline portion 502-B is updated (e.g., reset or recalibrated) to form a third baseline portion 502-C (dashed line to the right of point C). The third baseline portion 502-C is set to a value so that a difference between the third sensor electrode responses 504-C and the third baseline portion 502-C is close to zero.

After point C, in some situations or circumstances one or more proximity sensing events (e.g., proximity sensing event 510) are detected. As shown, the proximity sensing event 510 does not trigger recalibration of a new baseline as the proximity sensing event 510 does not satisfy the one or more electrode response criteria. Consequently, the wipe detection algorithm allows the touch sensitive device to process a proximity sensing event after a wipe of a wet touch screen. In some implementations, the water detection algorithm and wipe detection algorithm described herein are used for wet finger tracking.

Figure 6:
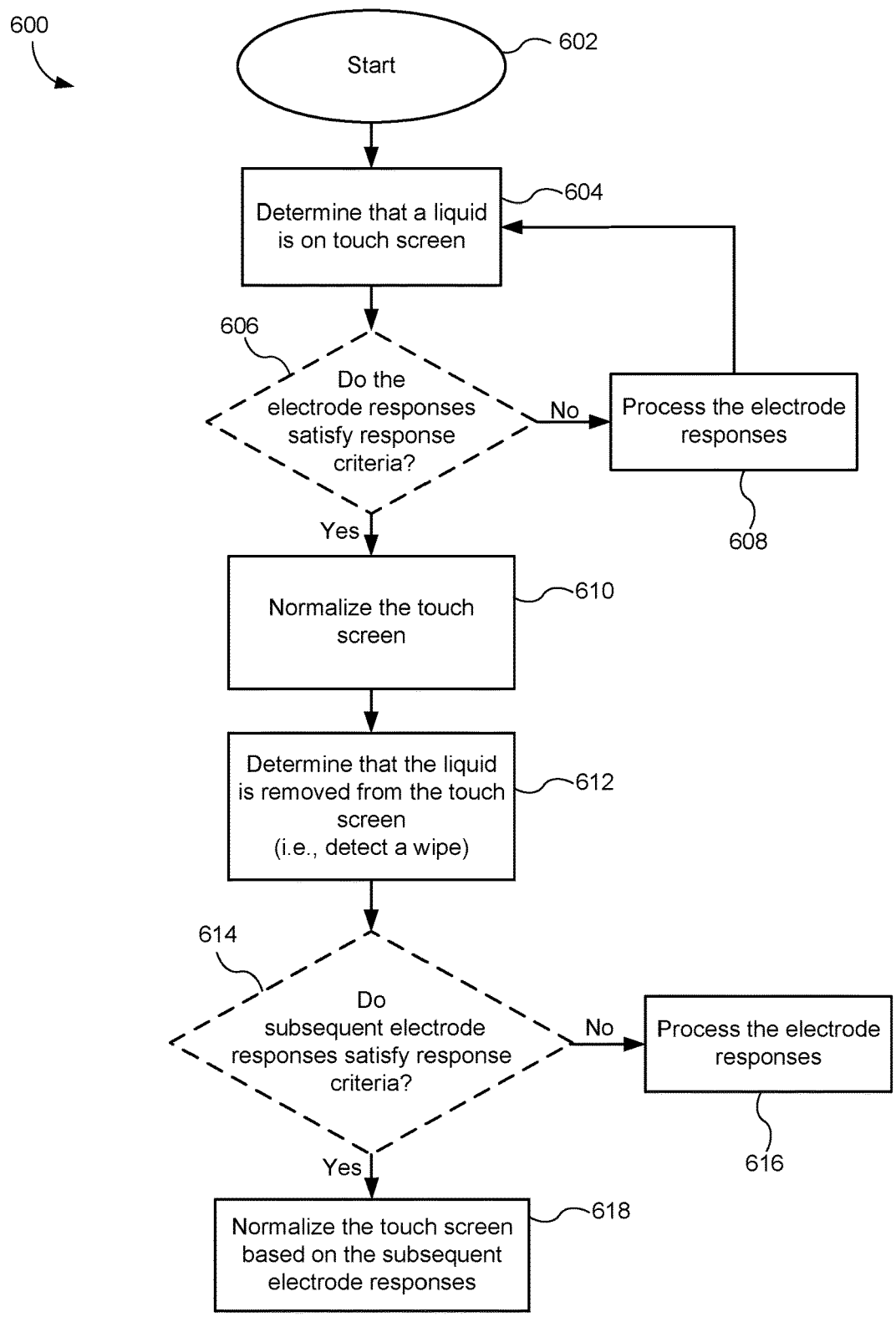
FIG. 6 provides a conceptual flowchart of a method of detecting water and removal of the water on a capacitive sense array, in accordance with some implementations.

FIG. 6 provides a conceptual flowchart of sensor electrode responses and baseline updating using a water detection algorithm and a wipe detection algorithm for touch-screen proximity sensing, in accordance with some implementations.

With reference to the sensing system 100 pictured in FIG. 1, in some implementations, a method 600 is performed by a processing device (e.g., processing device 120, FIG. 1) or one or more components of the processing device (e.g., touch controller 124). In some implementations, the method 600 is governed by instructions that are stored in a non-transitory computer-readable storage medium and that are executed by one or more processors of a device (e.g., a touch sensitive device), such as the one or more processing units (CPUs) 122-1 of management module 121-1 (FIG. 1).

In some implementations, some of the operations (or alternatively, steps) of method 600 are performed at a host system (e.g., computer system 110) that is operatively coupled with the processing device 120 and other operations of method 600 are performed at the processing device 120. In some of these implementations, method 600 is governed, at least in part, by instructions that are stored in a non-transitory computer-readable storage medium and that are executed by one or more processors (e.g., computer system 110) of the host system.

For ease of explanation, the following describes method 600 as performed by the processing device (also referred to as touch device or touch sensitive device) (e.g., processing device 120, FIG. 1). With reference to FIG. 3, in some implementations, the operations of method 600 are performed, at least in part, by a scan module (e.g., scan module 312, FIG. 3), a presence module (e.g., presence module 314, FIG. 3), a mode selection module (e.g., mode selection module 316, FIG. 3), and a normalization module (e.g., normalization module 318, FIG. 3) or a program that embodies one or more functions of these modules.

The method begins (602) when the processing device 120 determines (604) that a liquid (e.g., rain droplets) is on the touch sensitive display (e.g., touch screen 130, FIG. 1 or the capacitive sense array 202, FIG. 2). In some implementations, the processing device determines that the liquid is on the touch screen by detecting a decrease in electrode responses from at least a subset of the plurality of sensor electrodes. In some implementations, the processing device uses self-capacitance measurements to detect the decrease electrode responses from the subset of the plurality of sensor electrodes. In some implementations, the processing device 120 determines that the liquid is on the touch screen by detecting a threshold number of sensor electrodes (i.e., a set of sensor electrodes) having decreased electrode responses. In some implementations, the processing device 120 determines that the liquid is on the touch screen by detecting a threshold number of sensor electrode groups having decreased electrode responses. It should be noted that increases in electrode responses can also be used to determine that a liquid such as water is contacting the touch sensitive display.

Next, the processing device determines whether (606) the detected electrode responses satisfy one or more first sensor electrode response criteria associated with the water detection algorithm. If a detected electrode response for a respective sensor electrode (or a respective sensor electrode group) satisfies the one or more first response criteria as defined in the water detection algorithm, then the respective sensor electrode is said to be activated and is counted towards the threshold number of sensor electrodes. In some implementations, the detected electrode responses based on self-capacitance measurements are used to satisfy the one or more first response criteria. In some implementations, the detected electrode responses based on mutual-capacitance measurements are used to satisfy the one or more response criteria. In some implementations, the response criteria for touchscreen proximity sensing are distinct and separate from response criteria associated with normal touch detection (e.g., water is not on the touch screen).

In some implementations, satisfying the one or more first response criteria as defined by the water detection algorithm includes detecting a decrease in electrode responses (e.g., second sensor electrode responses 404-B, FIG. 4) that differs from a baseline (e.g., first baseline portion 402-A, FIG. 4) by at least a threshold amount. Further, in some implementations, satisfying the one or more first response criteria includes detecting a decrease in electrode responses that differs from the baseline for a predefined time period. In some implementations, the predefined time period corresponds to a number of scans of the touch sensitive display. In some implementations, satisfying the one or more first response criteria includes detecting a decrease in electrode responses that reaches or surpasses the threshold amount prior to expiration of a time limit. For example, in some implementations the expiration of the time limit requires the decrease in electrode responses be substantially instantaneous. In some implementations, the water detection algorithm requires satisfaction of at least two of the first response criteria.

It should be noted that in some circumstances, false positives for water detection may be triggered by other environmental factors (e.g., a temperature increase or decrease). A decrease in electrode responses resulting from a substantial decrease in temperature may in some circumstances differ from a baseline (e.g., first baseline portion 402-A, FIG. 4) by at least the threshold amount. In order to prevent these types of false positive events, in some implementations, the processing device records electrode response detected during one or more previous water detection cycles. Further, the water detection algorithm compares a detected decrease in electrode responses with the recorded electrode response from the one or more previous water detection cycles using the water detection algorithm. In this way, the water detection algorithm reduces false positives as response characteristics associated with a decrease in electrode responses due to a substantial decrease in temperature will differ from response characteristics associated with a decrease in electrode responses due to water droplets contacting the touch screen (e.g., a rate of decrease in electrode responses due to a substantial decrease in temperature occurs slowly relative to a rate of decrease in electrode responses due to water droplets contacting the touch screen).

In some implementations, the water detection algorithm includes one or more characteristics associated with a decrease in electrode responses due to water droplets contacting the touch screen (e.g., an average decrease in electrode responses due to water droplets contacting the touch screen). In some implementations, the water detection algorithm uses both (or just one) the recorded electrode response from the one or more previous water detection cycles and the average decrease in electrode responses due to water droplets contacting the touch screen in determining that a liquid is on the touch sensitive display.

In accordance with a determination that the detected electrode responses do not satisfy the one or more first response criteria (606—No), the processing device processes (608) the detected electrode responses as a proximity sensing event, normal touches, or simply ignores the detected electrode responses (e.g., noise). For example, the processing device processes the detected electrode responses as a proximity sensing event (e.g., user places touch sensitive device up to his or her face) when the detected electrode responses satisfy response criteria associated with proximity sensing events (or the detected electrode responses do not satisfy response criteria associated with a normal touch and the one or more response criteria associated with the water detection algorithm).

In accordance with a determination that the detected electrode responses do satisfy the one or more response criteria (606—Yes), the processing device (610) normalizes the touch screen (e.g., updates the first baseline to form a second baseline). In some implementations, normalizing the touch screen includes forming an updated baseline (e.g., second baseline portion 502-B, FIG. 5) that mirrors capacitance measurements associated with the detected electrode responses. For example, if an average capacitance measurement associated with the detected electrode responses is −1000 relative to an initial baseline (e.g., first baseline portion 502-A, FIG. 5), then the updated baseline will be set to −1000 relative to the initial baseline. In this way, a difference between the detected electrode responses and the updated baseline is close to zero. The adverse effects associated with the water being on touch sensitive display are substantially reduced and the touch sensitive display is able to operate normally (e.g., proximity detection functions as if water is not on the touch sensitive display). In some implementations, the updated baseline is a proximity dedicated baseline. In some implementations, the updated baseline is an overall detection baseline (e.g., applies to touch and proximity detection).

In some implementations, prior to normalizing the touch screen, the processing device identifies an average decrease in electrode responses from at least the subset of the plurality of sensor electrodes. In some implementations, the average decrease is substantially greater than the threshold amount.

In some implementations, the processing device determines (612) that the liquid is removed from the touch sensitive display using a wipe detection algorithm. In some implementations, the processing device determines that the liquid is removed (i.e., detects a wipe) by detecting a decrease in one or more subsequent electrode responses after detecting the decrease in electrode responses associated with the liquid being initially detected (e.g., decrease at step 602). In other words, the wipe detection algorithm processes and designates a second decrease in sensor electrode responses as a wipe. It should be noted the second decrease that is associated with the wipe can be detected in relation to the first baseline or the second baseline. In some implementations, the processing device determines that the liquid is removed (i.e., detects a wipe) from the touch screen when electrode responses vary from negative to positive and positive to negative one or more times with respect to one of the baselines. Using either approach, the processing device 120 determines that the liquid is removed from the touch screen by detecting a threshold number of sensor electrodes (i.e., a set of sensor electrodes) having decreased (or increased) electrode responses. In some implementations, the threshold number of sensor electrodes is the subset of the plurality of sensor electrodes.

In some implementations, the processing device pauses (i.e., takes a timeout) after determining that a liquid (e.g., rain droplets) is on the touch sensitive display to cancel out the detection. The main reason for this timeout is to take into account that if the water is not removed from the panel, then the water will dry out by itself after a period of time. Furthermore, the pause also prevents the side effects that false water detection may cause (e.g., false detection of a proximity sensing event).

Next, the processing device determines whether (614) the subsequent electrode responses (i.e., electrode responses caused by the wipe) satisfy one or more second response criteria (also referred to as trigger conditions). If a subsequent electrode response for a respective sensor electrode (or a respective sensor electrode group) satisfies the one or more second response criteria, then the respective sensor electrode is said to be activated and is counted towards the threshold number of sensor electrodes. If the threshold number of sensor electrodes is reached, then the processing device signals that a wipe has occurred (e.g., notifies a host system that a wipe has occurred). In some implementations, satisfying the one or more second response criteria includes detecting one or more changes in capacitance (e.g., third sensor electrode responses 404-C, FIG. 4) that differ from a second baseline (e.g., second baseline portion 402-B, FIG. 4) by at least a threshold amount. Further, in some implementations, satisfying the one or more second response criteria includes detecting a decrease in electrode responses that differs from the baseline for (or within) a predefined time period.

In accordance with a determination that the detected electrode responses do not satisfy the one or more second response criteria (614—No), the processing device processes (616) the subsequent electrode responses as a proximity sensing event, normal touches, or simply ignores the detected electrode responses (e.g., noise). For example, the processing device processes the subsequent electrode responses as a proximity sensing event (e.g., proximity events 507-1, 507-2, 507-3, FIG. 5).

In some implementations, in accordance with a determination that the detected electrode responses do satisfy the one or more response criteria (614—Yes), the processing device (618) normalizes the touch screen (e.g., updates the second baseline portion 502-B to form a third baseline portion 502-C, FIG. 5). In some implementations, updating the second baseline to form the third baseline includes setting the third baseline equal to the first baseline. In some implementations, the third baseline mirrors capacitance measurements associated with the detected one or more subsequent electrode responses. For example, if an average capacitance measurement associated with the detected one or more subsequent electrode responses is 800 relative to the second baseline, then the third baseline will be set to 800 relative to the second baseline. In some circumstances, the increase in capacitance associated with a wipe does not equal the decrease caused by the water being on the touch screen as a wipe generally will not remove all traces of the water. Nevertheless, a difference between the detected one or more subsequent electrode responses and the third baseline is close to zero when an average capacitance measurement associated with the detected one or more subsequent electrode is calculated.

In some implementations, prior to normalizing the touch screen based on the detected subsequent electrode responses, the processing device identifies a peak electrode response caused by (1) the removal of the liquid from the touch screen and (2) simultaneous contact from a user (e.g., electrode response 508, FIG. 5). Subsequently, the processing device identifies a decrease in electrode responses relative to the identified peak electrode response. The subsequent decrease results from the user's finger separating from the touch screen.

In some implementations, "Touchscreen Proximity Sensing" refers to a process of detect an approaching face to a touchscreen during a phone call and then to close the LCD screen to save power and to prevent false touches that face can cause. Proximity sensing is generally done by using an IR sensor. Touchscreen proximity sensing detects faces using an existing touchscreen rather than using an extra sensor.

In some implementations, "Raw-data" refers to filtered scan data.

In some implementations, "Noise floor" refers to a baseline. The noise floor follows the raw-data to keep the "diff-counts" close to zero when nothing is on the panel. This noise floor is used to get rid of the noise and get clean diff-count values as much as possible.

In some implementations, "Diff-counts" are the difference between raw-data and the noise floor. Diff-counts are expected to be around zero when nothing is on the panel and expected to be high when some object (finger or proximity) is on the panel.

In some implementations, Touchscreen proximity sensing uses high sensitive self-capacitance scan to be able to detect the presence of an object above the touchscreen panel. This takes advantage of the increasing self-capacitance raw-data when there is an object approaching to the panel. The noise floor "follows" the raw-data when there is no object above the panel. This noise floor stops following the raw-data when there is a significant increase in the raw-data resulting from an approaching object.

Applying water to the panel and wiping the water off the panel changes the self-capacitance raw-data and diminishes the effectiveness of proximity sensing. Proximity sensing should be able to work when there is water on the panel and should be able to recover to its normal functionality after wiping the water off the panel.

The disclosed techniques provide functionality to detect the water when it hits the panel and to detect when it is being wiped off the panel.

Water droplets hitting the panel result in a steep drop in self-capacitance raw-data. As a result, it is possible to detect the water once it hits the panel. However, the drop in the raw-data may be caused by an environmental change such as temperature. In an environmental change case, the drop in the raw-data happens slowly rather than an instant drop. In order to prevent false water detection in such a case, a mechanism that compares the dropped raw-data with the raw-data from a number of cycles before along with the average raw-data obtained at the initialization may be included in the algorithm.

To provide robustness, some implementations provide a number of tuning parameters, including one or more of:

The amount of decrease in raw-data when the water drop hits to the panel.

Number of frames to reset the noise floor to raw-data after water is detected.

From the number of frames before to hold the raw-data to compare with the current raw-data to make sure the drop in the raw-data is instant Number of frames to take average of the raw-data at the initialization.

The minimum required number of sensors affected by the water drops.

The minimum number of transition of the raw-data from positive to negative or negative to positive while wiping the water of the panel.

Number of frames to reset the noise floor to raw-data after wipe is detected.

Number of seconds to timeout the water detection and stop polling for wipe detection.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method, comprising:
at an electronic device having a processor and a capacitive sense array that includes a plurality of sensor electrodes:
determining that a liquid is on at least a portion of the capacitive sense array based on changes in electrode responses from at least a subset of the plurality of sensor electrodes that differ from a first baseline by at least a first threshold amount, wherein the detected changes in electrode responses differ from the first baseline for at least a first predefined time period;
after determining that the liquid is on at least the portion of the capacitive sense array:
normalizing the capacitive sense array based on the detected changes in electrode responses to form a second baseline, wherein the second baseline differs from the first baseline by at least the first threshold amount;
detecting two or more subsequent electrode responses, from at least the subset of the plurality of sensor electrodes, that differ from the second baseline by at least a second threshold amount;
determining whether the two or more subsequent electrode responses satisfy an electrode response pattern associated with a liquid-removing wipe gesture, wherein the electrode-response pattern is satisfied when the two or more subsequent electrode responses vary from negative to positive with respect to the first baseline and then positive to negative with respect to the first baseline; and
in accordance with a determination that the two or more subsequent electrode responses satisfy the electrode-response pattern associated with the liquid-removing wipe gesture, normalizing the capacitive sense array, to form a third baseline, based on the detected two or more subsequent electrode responses to account for liquid removed from the capacitive sense array by the liquid-removing wipe gesture, wherein the third baseline differs from the second baseline by at least the second threshold amount.

2. The method of claim 1, wherein the two or more subsequent electrode responses differ from the second baseline for a second predefined time period.

3. The method of claim 1, wherein determining that the liquid is on at least the portion of the capacitive sense array includes measuring self-capacitance of sensor electrodes that comprise the portion of the capacitive sense array.

4. The method of claim 1, further comprising:
while determining that the liquid is on at least the portion of the capacitive sense array:
comparing the detected changes in electrode responses from at least the subset of the plurality of sensor electrodes against changes in electrode responses recorded during one or more previous cycles; and
in accordance with a determination that the detected changes in electrode responses substantially match the changes in electrode responses recorded during the one or more previous cycles, signaling that the liquid is on at least the portion of the capacitive sense array.

5. The method of claim 1, further comprising:
subsequent to normalizing the capacitive sense array to form the second baseline, detecting one or more proximity sensing events, wherein electrode responses associated with each of the one or more proximity sensing events differ from the second baseline by less than the second threshold amount.

6. The method of claim 1, further comprising, at the electronic device:

determining whether a number of sensor electrodes responsible for detecting the two or more subsequent electrode responses satisfies a sensor electrode threshold, wherein normalizing the capacitive sense array to form the third baseline is further performed in accordance with a determination that the number of sensor electrodes responsible for detecting the two or more subsequent electrode responses satisfies the sensor electrode threshold.

7. The method of claim 1, further comprising, at the electronic device:

in accordance with a determination that the detected two or more subsequent electrode responses do not satisfy the electrode-response pattern, ignoring the detected two or more subsequent electrode responses.

8. The method of claim 1, wherein:

the two or more subsequent electrode responses are averaged, and the averaged subsequent electrode response is used to determine whether the electrode-response pattern is satisfied.

9. A system comprising:

a capacitive sense array including a plurality of sensor electrodes; and a processing device coupled to the capacitive sense array, the processing device configured to:

determine that a liquid is on at least a portion of the capacitive sense array based on changes in electrode responses from at least a subset of the plurality of sensor electrodes that differ from a first baseline by at least a first threshold amount, wherein the detected changes in electrode responses differ from the first baseline for at least a first predefined time period;

after determining that the liquid is on at least the portion of the capacitive sense array:

normalize the capacitive sense array based on the detected changes in electrode responses to form a second baseline, wherein the second baseline differs from the first baseline by at least the first threshold amount;

detect two or more subsequent electrode responses, from at least the subset of the plurality of sensor electrodes, that differ from the second baseline by at least a second threshold amount;

determine whether the two or more subsequent electrode responses satisfy an electrode response pattern associated with a liquid-removing wipe gesture, wherein the electrode-response pattern is satisfied when the two or more subsequent electrode responses vary from negative to positive with respect to the first baseline and then positive to negative with respect to the first baseline; and in accordance with a determination that the two or more subsequent electrode responses satisfy the electrode-response pattern associated with the liquid-removing wipe gesture, normalize the capacitive sense array, to form a third baseline, based on the detected two or more subsequent electrode responses to account for liquid removed from the capacitive sense array by the liquid-removing wipe gesture, wherein the third baseline differs from the second baseline by at least the second threshold amount.

10. The system of claim 9, wherein determining that the liquid is on at least the portion of the capacitive sense array includes measuring self-capacitance of sensor electrodes that comprise the portion of the capacitive sense array.

11. The system of claim 9, wherein the processing device is further configured to:

while determining that the liquid is on at least the portion of the capacitive sense array:

compare the detected changes in electrode responses from at least the subset of the plurality of sensor electrodes against changes in electrode responses recorded during one or more previous cycles; and in accordance with a determination that the detected changes in electrode responses substantially match the changes in electrode responses recorded during the one or more previous cycles, signal that the liquid is on at least the portion of the capacitive sense array.

12. The system of claim 9, wherein the two or more subsequent electrode responses differ from the second baseline for a second predefined time period.

13. The system of claim 9, further comprising:

subsequent to normalizing the capacitive sense array to form the second baseline, detecting one or more proximity sensing events, wherein electrode responses associated with each of the one or more proximity sensing events differ from the second baseline by less than the second threshold amount.

14. A non-transitory computer readable storage medium, storing one or more programs configured for execution by one or more processors of a sensing system that includes a capacitive sense array having a plurality of sensor electrodes, the one or more programs including instructions, which when executed by the one or more processors cause the sensing system to:

determine that a liquid is on at least a portion of the capacitive sense array based on changes in electrode responses from at least a subset of the plurality of sensor electrodes that differ from a first baseline by at least a first threshold amount, wherein the detected changes in electrode responses differ from the first baseline for at least a first predefined time period;

after determining that the liquid is on at least the portion of the capacitive sense array:

normalize the capacitive sense array based on the detected changes in electrode responses to form a second baseline, wherein the second baseline differs from the first baseline by at least the first threshold amount;

detect two or more subsequent electrode responses, from at least the subset of the plurality of sensor electrodes, that differ from the second baseline by at least a second threshold amount;

determine whether the two or more subsequent electrode responses satisfy an electrode response pattern associated with a liquid-removing wipe gesture, wherein the electrode-response pattern is satisfied when the two or more subsequent electrode responses vary from negative to positive with respect to the first baseline and then positive to negative with respect to the first baseline; and in accordance with a determination that the two or more subsequent electrode responses satisfy the electrode-response pattern associated with the liquid-removing wipe gesture, normalize the capacitive sense array, to form a third baseline, based on the detected two or more subsequent electrode responses to account for liquid removed from the capacitive sense array by the liquid-removing wipe gesture, wherein the third baseline differs from the second baseline by at least the second threshold amount.

15. The non-transitory computer readable storage medium of claim 14, wherein determining that the liquid is on at least the portion of the capacitive sense array includes measuring self-capacitance of sensor electrodes that comprise the portion of the capacitive sense array.

16. The non-transitory computer readable storage medium of claim 14, wherein the one or more programs further include instructions, which when executed by the one or more processors, cause the sensing system to:
   while determining that the liquid is on at least the portion of the capacitive sense array:
      compare the detected changes in electrode responses from at least the subset of the plurality of sensor electrodes against changes in electrode responses recorded during one or more previous cycles; and
      in accordance with a determination that the detected changes in electrode responses substantially match the changes in electrode responses recorded during the one or more previous cycles, signal that the liquid is on at least the portion of the capacitive sense array.

17. The non-transitory computer readable storage medium of claim 14, wherein the one or more programs further include instructions, which when executed by the one or more processors, cause the sensing system to:
   in accordance with a determination that the two or more subsequent electrode responses resulting from the liquid-removing wipe gesture do not satisfy the predefined electrode-response pattern, process the subsequent electrode responses as a normal touch event.

* * * * *